March 21, 1967

S. V. CHELMINSKI 3,310,128

SEISMIC EXPLORATION METHODS AND SYSTEMS

Filed Jan. 24, 1964

INVENTOR.
STEPHEN V. CHELMINSKI

BY
Curtis, Morris & Safford
ATTORNEYS

FIG. 2

United States Patent Office 3,310,128
Patented Mar. 21, 1967

3,310,128
SEISMIC EXPLORATION METHODS AND SYSTEMS
Stephen V. Chelminski, Redding, Conn., assignor to Bolt Associates, Inc., East Norwalk, Conn.
Filed Jan. 24, 1964, Ser. No. 340,097
13 Claims. (Cl. 181—.5)

The present invention relates to seismic exploration methods and systems and particularly to land exploration methods and systems utilizing powerful sound impulses which are generated by the abrupt release of confined gases.

Among the many advantages of the seismic exploration methods and systems for land survey which are described herein as illustrative embodiments of the present invention are those resulting from the fact that intense acoustical impulses are transmitted into the earth's crust at a desired site, and these impulses can be repeated at frequent intervals as may be desired. A network of geophones is used to sense and to provide a recording of the resulting earth tremors at various points in the ground spaced from the site at which the powerful sound impulses are transmitted into the earth. In this way information is obtained about the conditions and characteristics of the geologic formations in the region being surveyed.

It is known that explosives can be used for producing earth tremors for exploration of geologic formations. However, there are certain drawbacks in the use of explosives, including the hazards and dangers of handling them and the expense and delay involved in making each "shot." Considerable time and labor are often involved in placing the explosives in a suitable hole or holes in the ground with the earth properly packed and tamped around the explosive charge. After the charge has been detonated, a protracted time period is often consumed in setting up and positioning the explosive charge in readiness for the next "shot." Thus, many man hours and substantial quantities of explosives are often involved in making a survey so that the costs of such surveys have often run into many thousands of dollars.

Advantageously, the present invention enables intense acoustical impulses to be transmitted into the earth at a predetermined location at frequent intervals, for example such as once every ten seconds or more often, if desired, so that each "shot" can be made soon after the earth tremors from the previous shot have been dissipated. Moreover, a sequence of related "shots" can be made at various locations in the vicinity of each other and within a few seconds of each other so as to provide correlations between the resulting earth tremors produced by each shot. Soon after the earth tremors have died down the sequence can be repeated with the same relative timed relationships or with different timed relationships. Thus, in the course of a few hours a large multitude of individual "shots" and related sequences of shots can be made with a wide variety of interrelated time relationships as may be desired.

Also, the illustrative methods and systems which are described herein as embodying the invention enable the seismic sound impulses to be transmitted into the earth at a desired site without requiring any special preparation of the earth at the site. The seismic impulse source includes a container of water having a diaphragm extending across the bottom which is placed on the ground at the site and then an abrupt release of confined gas into the water in the container produces a powerful sound impulse which is transmitted down through the diaphragm into the ground. This container may be mounted on a vehicle and is readily filled with water and later may be readily emptied so that a survey crew is enabled quickly and conveniently to move the container and quickly set it up at a new site in readiness for making each survey or for economically carrying out a program of related surveys. An acoustical impulse generator also referred to as an "acoustical repeater" is located within the water container and serves to confine a suitable gas or mixture of gases under pressure, for example such as compressed air or pressurized products of combustion, and the pressurized gas is abruptly released by this acoustical repeater so as to produce the seismic impulses.

It is an object of the present invention to advance the art of seismic exploration of land masses.

A further object of this invention is to provide improved seismic exploration and land survey systems.

In this specification and in the accompanying drawings are described and shown seismic exploration methods and systems embodying the invention and it is to be understood that this disclosure is not intended to be exhaustive nor limiting of the invention, but is set forth for purposes of illustration in order that others skilled in the art may fully understand the invention and the manner of its application in practical use under widely varying survey conditions and circumstances.

The various objects, aspects and advantages of the present invention will be in part more fully pointed out and in part will be understood from the following description of illustrative embodiments of the invention, when considered in conjunction with the accompany drawings in which:

FIGURE 4 is an axial sectional view of an acoustical repeater such as may be included in the source of FIGURE 1. FIGURE 4 also includes a schematic diagram of apparatus for operating the repeater.

FIGURE 5 is a cross sectional view of the repeater of FIGURE 4 taken along the line 5—5 of FIGURE 4.

Figure 1:
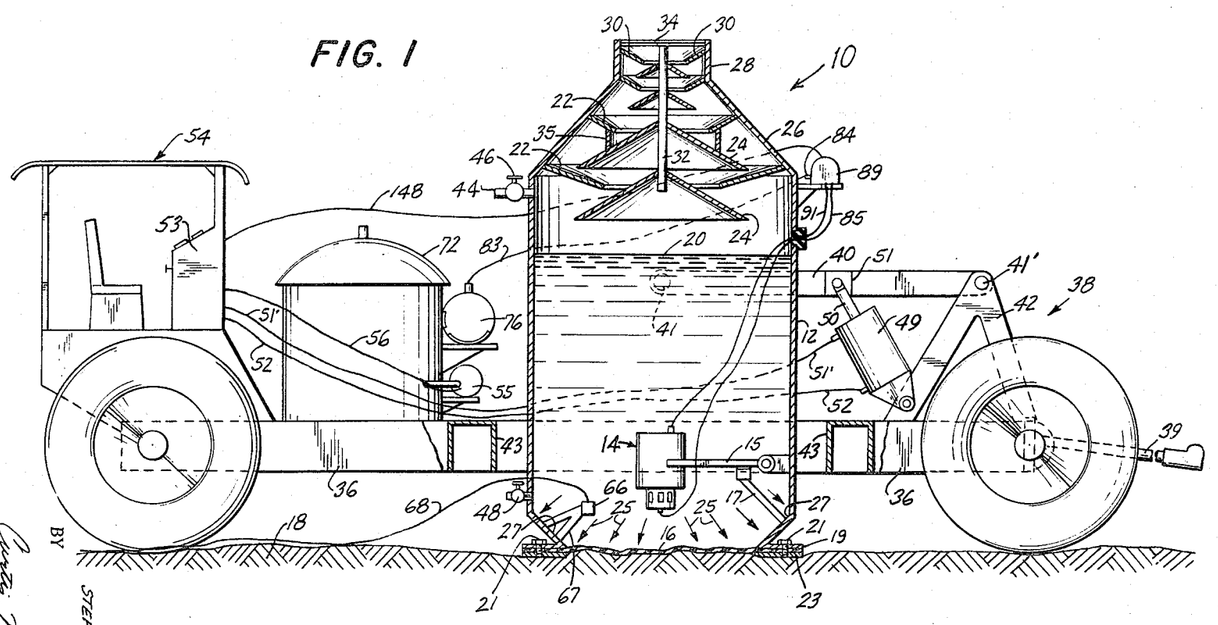
FIGURE 1 is a cross sectional view of the seismic impulse source resting on the ground and being mounted on the chassis of a vehicle for conveniently transporting the source.

As shown in FIGURE 1 the seismic impulse source 10 includes a cylindrical tank 12 having a vertical axis, and an acoustical repeater 14, for example such a repeater as shown in FIGURES 4, 5, 6 and 7, is positioned in the center of this tank near the bottom end of the tank and is held by a pivoted radial bracket 15, which normally rests down against a stop 17. The cylindrical side wall of the tank is strong and rigid, being formed of curved steel plate or similar strong material. The bottom end 16 of the tank is flexible, and during operation it rests upon the ground 18. In this illustrative example of the invention the bottom end 16 of the tank is formed by a strong, flexible and slack diaphragm of resilient material, for example of material such as rubber, plastic and the like. This rubber diaphragm extends across the bottom of the tank like a slack drumhead and is rested down upon the ground at the geographical location at which the intense seismic sound impulses are intended to be transmitted into the earth. The perimeter of this diaphragm 16 is clamped to a flange 19 on the bottom of the tank 12 by means of a plurality of bolts 21 secured to a clamping ring 23 beneath the diaphragm. The purpose of the diaphragm 16 is to transmit the seismic impulses into the earth 18 without undue attenuation thereof, and thus a metal diaphragm may be used, if it is sufficiently flexible to accomplish this result; for example, the bottom of the tank 12 may be formed by a thin, tough metal diaphragm of material such as mild steel.

The tank 12 is shown approximately two-thirds full of water 20 so that the repeater 14 is submerged, and the depth of the water as measured from the repeater to the surface of the water substantially exceeds the depth of the water as measured downwardly from the repeater to the flexible diaphragm 16. This repeater 14 is capable of suddenly releasing a large quantity of confined, highly compressed gas, as will be explained further below. When this gas is abruptly released into the water 20 surrounding the repeater in the tank, there is an intense acoustical impulse emitted into the water. A large proportion of this acoustical impulse is transmitted down through the water 10 and through the diaphragm 16 into the earth 18 beneath it. The relatively large quantity of water above the repeater 14 provides a mass against which the abruptly released gas thrusts itself to produce an intense "boom," and this mass of water above the repeater also serves to absorb the reaction from the powerful impulse 25 being transmitted down into the earth so as to prevent the whole tank from violently jumping upwardly. This water above the repeater 14 absorbs the reaction by being blasted upwardly by the suddenly released quantity of gas. For thrusting the tank 12 firmly down against the earth during the instant that the impulse 25 is moving down through the diaphragm 16, the tank 12 includes a down-thrust area 27 formed by an inwardly sloping truncated conical wall area which surrounds the diaphragm 16 and is immediately adjacent to the perimeter of this diaphragm.

The pivoted bracket 15 permits the repeater 14 to recoil upwardly in response to the reaction of the abruptly released gas.

In order to prevent this upwardly blasted water from being blown completely out of the tank 12 there are a series of staggered baffles 22 and 24 in the upper portion of the tank and being spaced a substantial distance above the initial quiescent level of the water in the tank. The upward progress of the water is slowed down and finally stopped by these baffles, which are sloped so that the water can readily drain back down to its normal initial position as shown. Above this baffle system 22, 24 the tank 12 is vented to the atmosphere through an upwardly converging conical top portion 26 of the tank having an air vent 28 at the apex. Additional baffles 30 are positioned in the conical top of the tank adjacent to the air vent 28 to assure that no significant quantity of water is blown out through the air vent. The outer baffles 22 are annular in configuration, extending around adjacent to the wall of the tank, and being secured to the wall. The inner baffles 24 are conical and are supported by a central column 32 held by a plurality of radial strut arms 34 and by braces 35.

For conveniently transporting the seismic impulse source 10, it is mounted upon a chassis 36 of a vehicle 38, for example such as a truck, tractor, trailer and the like, and in this example the vehicle 38 is a four-wheel trailer having a towing and steering tongue 39. A pair of pivoted arms 40 straddle the tank and are secured to trunnions 41 on respective sides of the tank 12 and being located above the level of the center of gravity of the tank. These arms 40 are fastened to a pivot bar 41' on a frame 42 which is anchored on the chassis 36. The lower end of the tank extends down through a frame opening 43 in the chassis 36.

The tank 12 is supplied by water through a hose coupling 44 and a valve 46. When it is desired to move the survey operations to a new location, then the water 20 may be removed from the tank 12 by opening a valve 48. In order to raise the tank 12 off from the ground, a double-acting hydraulic cylinder 49 is mounted on the chassis 36 and its piston rod 50 is connected to a transverse brace 51 extending between the arms 40. Actuation of the cylinder 49 raises the arms 40 when desired. Also, by virtue of the fact that the cylinder 49 is double-acting it may be actuated in the direction to pull the arms 40 downwardly so that the weight of the vehicle 38 presses the tank 12 firmly against the surface of the earth. The cylinder 49 is connected by hydraulic lines 51' and 52 to a control panel 53 in an operator's cab 54, and fluid is supplied from a hydraulic fluid reservoir tank 55 through a line 56 to suitable valve means in the control panel 53. A source 72 of pressure fluid includes a hydraulic fluid pump connected to the tank 55.

As soon as the vehicle 38 has arrived at the new exploration site, the impulse source 10 is lowered down onto the ground, and water is pumped in through the valve 46 into the tank 12 and immediately the impulse source 10 is ready for operation. There are no special preparations of the ground required for receiving the diaphragm 16, except that the surface of the earth should be free of protruding objects such as surface rocks or stumps of such size as might rupture the diaphragm 16.

Figure 2:
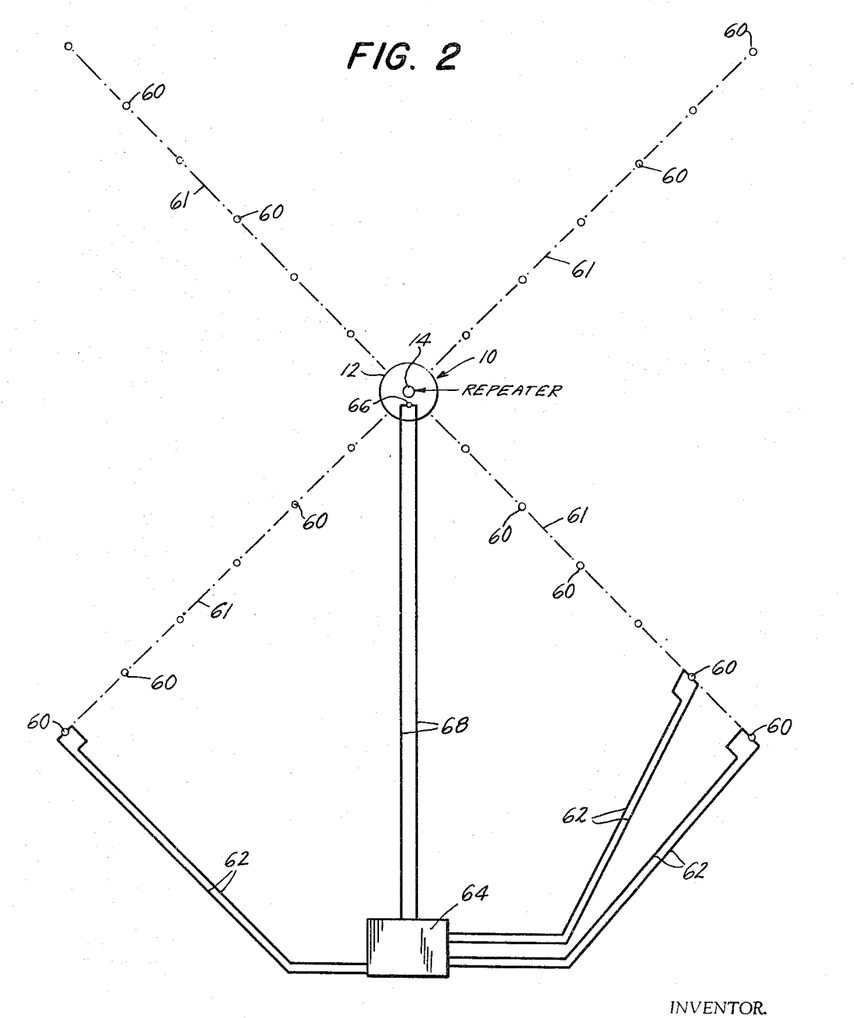
FIGURE 2 is a plan view of a survey system including the seismic impulse source of FIGURE 1.

In the exploration system shown in FIGURE 2 in plan view there are a plurality of geophones 60 arranged in a pattern on the ground with relation to the seismic impulse source 10. The particular pattern which is used depends upon the type of survey being made. A typical arrangement is to locate the geophones 60 at uniformly spaced points along one or more radial lines 61 extending outwardly from the source 10 as shown in FIGURE 2. Each geophone 12 is connected by a pair of wires, for example such as the pairs of wires 62, with suitable recording equipment 64, which is available commercially, for example such as multichannel recording galvanometers or multichannel magnetic tape recorders. This recording equipment 64 is positioned at a substantial distance away from the acoustical impulse source 10, so as to avoid any undesired mechanical shocks on this equipment.

In the survey system in FIGURE 2, which is shown as including twenty-four geophones, the recording equipment 64 includes at least twenty-four independent recording channels. Each channel makes a recorded plot on a suitable chart of the signals received from one of the geophones 60. Thus, it is to be understood that there are twenty-four pairs of wires 62 extending from the recording equipment 64 to the twenty-four individual geophones 60. In order to clarify the drawing only a few pairs of these wires have been drawn to illustrate the electrical connections. The recording equipment 64 including a suitable chart for making twenty-four recorded plots of the electrical signals received from the respective geophones is available commercially, and so the details of this equipment are not shown.

For the purpose of providing a recorded signal on the chart in the equipment 64 at the precise instant when the impulse source 10 is transmitting the acoustical impulse down through the diaphragm 16 into the ground, a pressure-responsive transducer, for example such as a hydrophone 66 is positioned in the water 20 near the diaphragm 16. This hydrophone 66 is mounted on a soft rubber bracket 67 so as to prevent any response from mechanical vibrations which may be transmitted by the tank wall, and 66 is connected by a pair of wires 68 with a recording device in the equipment 64. Consequently, a reference line or trace is made on the chart at the precise instant when the seismic impulse tank source 10 is actually making a "shot," i.e. is transmitting the intense acoustical impulse into the earth. When the chart is subsequently being studied and analyzed, this reference mark enables the time relationship of the twenty-four recorded plots on the chart to be determined precisely with respect to the instant of firing. This precise reference mark is advantageous for purposes of analysis to determine the speed of transit of the seismic impulses through the various geologic formations from the source 10 to the respective geophones 60.

Moreover, the tank source 10 is advantageous for seismic surveying because the acoustical impulses can be repeated at frequent intervals, for example once every ten seconds as may be desired. The repeater device 14 itself is capable of being fired more rapidly than this, for example once every two seconds, as will be explained below, but a longer period, such as ten seconds between firings is used in this system to allow time between each "shot" for the water to drain back down from the baffles in the tank and settle down to its initial quiescent level.

Figure 3:
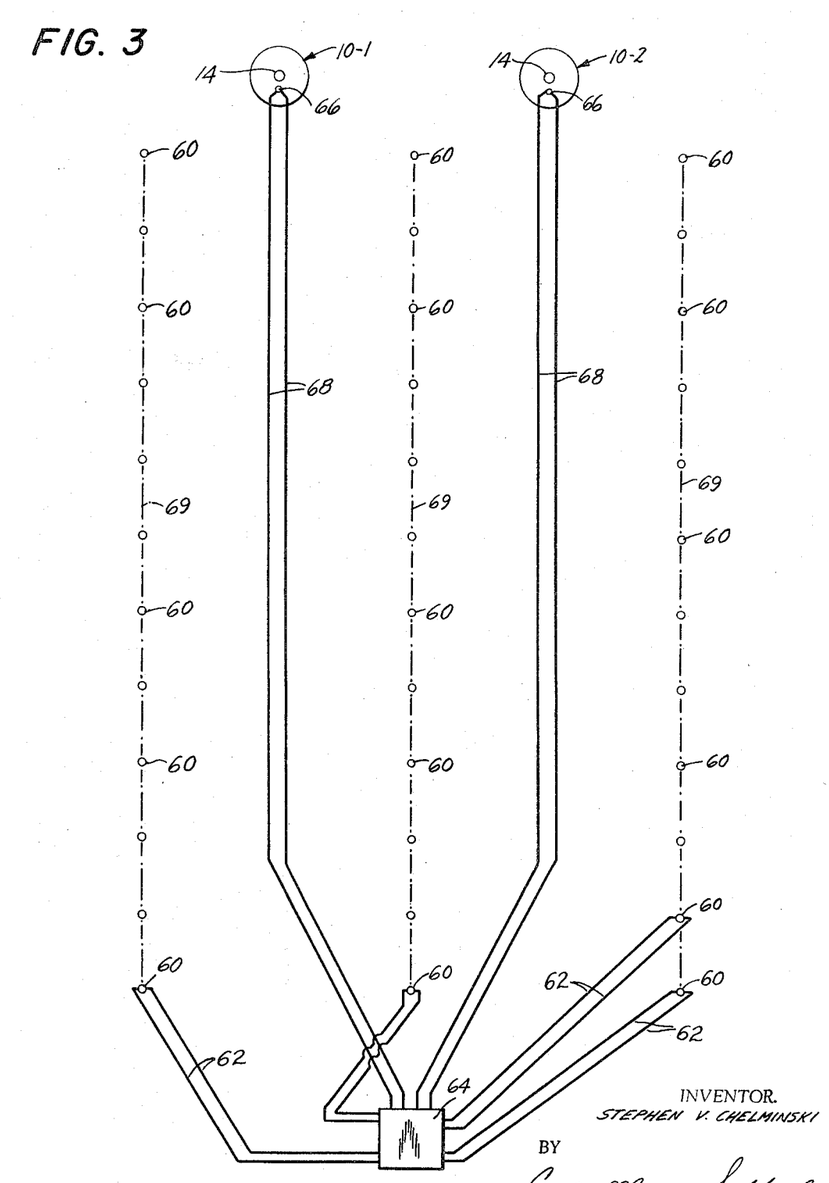
FIGURE 3 is a plan view of a survey system utilizing a plurality of seismic impulse sources.

The land exploration methods and system illustratively shown in FIGURE 3 are generally similar to those of FIGURES 1 and 2 and parts performing functions corresponding to those of the methods and systems of FIGURES 1 and 2 have the reference numbers. The exploration system of FIGURE 3 includes a pair of seismic impulse source 10-1 and 10-2, with the geophones 60 being arranged along a plurality of parallel lines 69. The seismic impulse sources 10-1 and 10-2 each include a repeater 14 and a hydrophone 66. These hydrophones 66 are each connected by a pair of wires 68 to the recording equipment 64 so as to provide reference lines on the chart at the instants when the respective sources 10-1 and 10-2 are shot, for in some surveys these sources 10-1 and 10-2 may be shot simultaneously, and at other times they may be shot one after the other with a time period between the start of their respective impulses, as may be desired for making various survey recordings.

The acoustical repeater 14 is illustratively shown in FIGURES 4 and 5 includes container means 70 adapted to hold gases therein under high pressure and to release the high-pressure gases abruptly through the ports 71 in response to an external control signal, as will be explained. In order to supply fluid under high pressure to the repeater 14, the system includes a suitable source 72 of high-pressure fluid located on the vehicle 38. In this system the high-pressure fluid being used is compressed air, and the source 72 includes a prime mover drive motor 73 running a multistage air compressor 74, which is capable of supplying compressed air at pressures up to and in excess of 2,000 pounds per square inch. The output of compressor 74 feeds through a moisture and oil separator 75 into a high-pressure storage tank 76. The compressed air is supplied from the tank through a shut-off valve 77 and through a first filter 78 into a pressure regulator 79 having a manual adjusting control 80 which is set at a desired pressure level, for example such as 2,000 p.s.i. At the output of the regulator is a pressure gauge 81 and a pipe coupling 82 connected to a flexible high-pressure fluid supply hose 83 extending to the repeater 14. Included near the repeater 14 is a second filter 84 having a porous bronze filter element or similar filter barrier element for preventing the entry of dirt particles or fibers into the repeater apparatus 14.

Beyond the filter 84 the hose line branches, and one branch 85 is connected through a hose line 86 to a fill port 90 entering the repeater 14. The other branch 88 of the high-pressure supply line 83 is connected through a normally closed, electrically actuated valve 89 to a firing hose line 91 which provides a fluid-conducting passage extending to a firing port 92. This passage 91 is normally shut off by the valve 89, which is herein called the firing control valve, and when the valve 89 is opened a "shot" is made, as will be explained further below.

Figures 4, 5:
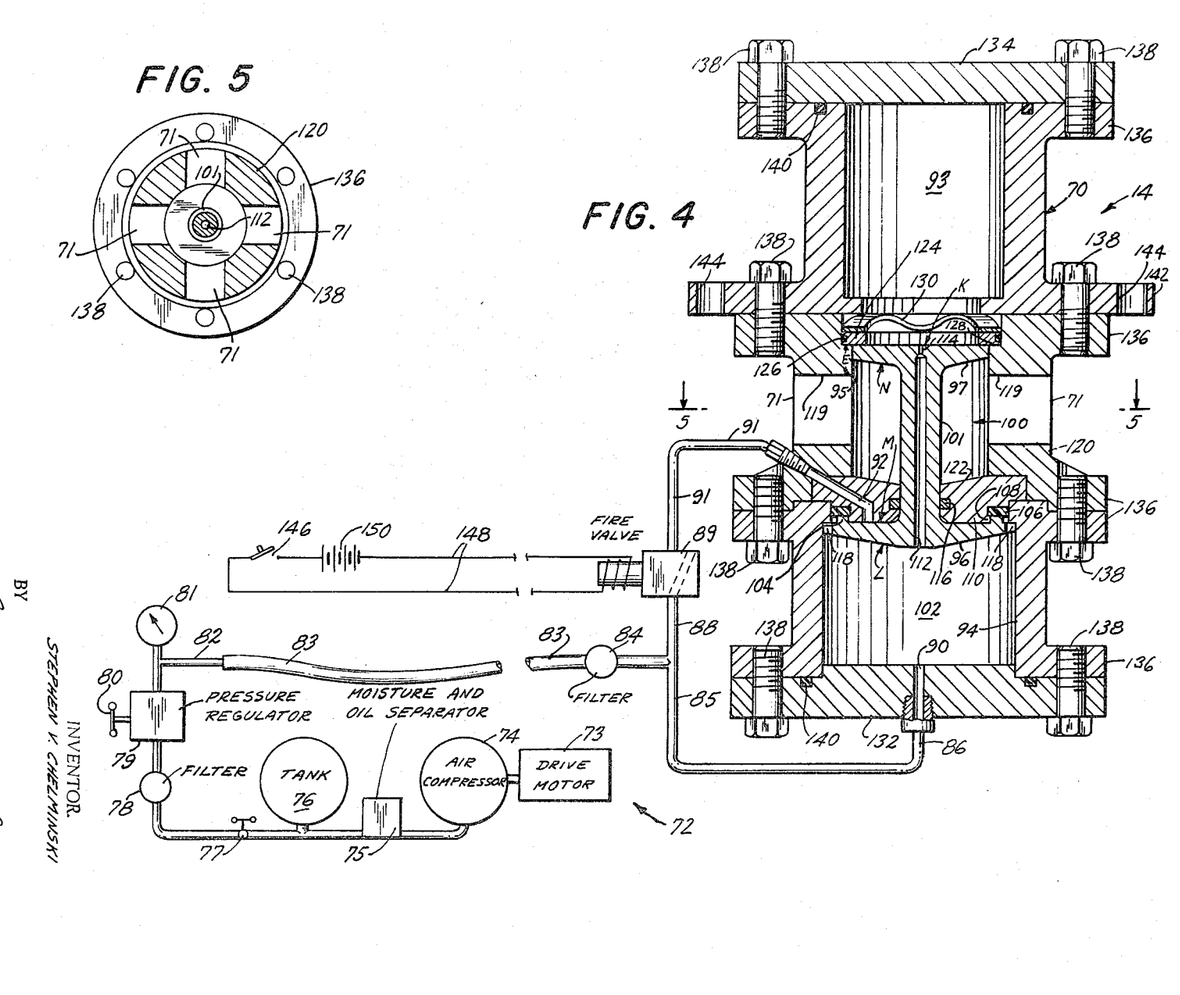

The acoustical repeater 14 as illustratively shown in FIGURES 4 and 5 comprises container means 70 including a charge-containing chamber 93 adapted to hold pressurized fluid therein and to discharge the fluid suddenly in a very brief time period through the ports 71 in response to an external control signal which opens the valve 89. Because of the fact that the repeater 14 is cyclically subjected to high stresses in operation and is exposed to corrosive environmental conditions, for example, it may be submerged in aerated water for long periods of time, it is constructed of high-strength corrosion resistant material, such as high-strength stainless steel. The container means 70 includes a plurality of axially aligned cylinders 94 and 95 each having a piston 96 and 97, respectively, in sliding engagement therewith. These pistons are rigidly interconnected to form a shuttle 100 so that they are capable of movement with very great acceleration over a predetermined distance before suddenly discharging the high-pressure fluid through the vent means 71 from the repeater 14.

One of these pistons 97 serves as opening and closing means for containing and then releasing the high-pressure gas from the chamber 93, and the other piston 96 serves as operating means for the first piston for holding it closed and then for releasing it in response to the external firing signal so that the shuttle 100 then moves with very great acceleration before the opening piston 97 opens the vent means 71 for discharging the high-pressure fluid.

Consequently, the vent means 71 are opened abruptly, for the opening piston 97 is travelling very fast at the instant when the vent means 71 are opened, thus advantageously providing an effectively instantaneous transition from fully closed to fully open condition. The shuttle 100 is constructed as light as possible while being sufficiently strong to withstand very great acceleration and subsequent deceleration in the axial direction. A hollow piston rod 101 interconnects the pistons 96 and 97.

In operation in preparation for making a shot the high-pressure fluid is introduced through the port 90 into a chamber 102 and serves to return the shuttle 100 so as to seat a sealing ridge element 104 on the piston 96 up against a resilient static seal 106. This seal 106 is formed of a very tough, resilient material, for example, tough, solid polyurethane which has sufficient ability to be bent so as to enable it to be fitted over a holding lip 108 on an annular guide member 110 which surrounds the piston rod 101. The sealing fluid passes up through an axial passage 112 in the piston rod 101 and into the charge-containing chamber 93 to fill it also. A constriction 114 in the passage 112 maintains the pressure in the chamber 102 above that in the chamber 93 during the beginning of the fill sequence so that there is provided a net upward thrust on the projected area of the piston rod 101 exposed to the pressure of the fluid in the chamber 102, said pressure being retained by a piston ring 116. This net upward thrust assures that the seal ring ridge element 104 remains seated firmly against the seal 106 during the initial portion of the fill cycle as the pressurized gas begins to be introduced. The effective area L of the operating piston 96 as defined by the sealing diameter of the ridge 104 engaging the seal 106 exceeds the effective area K of the closing and opening piston 97 and holds this piston in its closed position as the filling continues.

After the chamber 93 is filled up to the desired pressure, then the repeater 14 is fired at the appropriate instant by opening the firing solenoid valve 89 so as to provide communication between the high-pressure gas and the top surface M of the piston 96. This flow tends to equalize the pressure against opposite surfaces L and M of the operating piston 96, thus permitting the pressurized gas in the charge chamber 93 acting on the area K of the piston 97 to begin accelerating the shuttle 100 toward the opening position. As soon as the sealing element 104 has left the seat 106, then the gas in the chamber 102 rushes up through numerous openings 118 in the scalloped perimeter of the piston 96. These openings 118 may be inclined so as to provide a torque reaction upon rapid movement of the gas therethrough for rotating the shuttle 100. Thus, the pressure on both sides of the operating piston 96 is equalized. Consequently, the shuttle 100 picks up speed with very great acceleration driven by the great force of the gas charge acting against the piston area K as the piston 97 travels through an acceleration distance E, and therefore the piston 97 is moving at a high rate of speed as it passes the end 119 of the cylinder 95 so as to open the vents 71 very abruptly. These vents open out through a middle body portion 120 of the repeater 14.

In order to decelerate the shuttle 100 after the abrupt discharge of the gas from the charge chamber 93, there is a conical stop surface 122 opposed to a conical surface N of the piston 97 for decelerating the shuttle at the conclusion of its high-speed stroke by forcing the water out from between these two surfaces through the lower part of the vents 71. The outlet port from the charge chamber 93 is defined by a seal ring element 124 which is made from a very tough and durable material such as strong metal, e.g. stainless steel, beryllium bronze and the like. In the repeaters of the type shown in FIGURE 7 into which fuel is injected and burned, as explained further below, it is advantageous to form this seal 124 of a very tough and hard strong flame-resistant material such as metal to withstand the discharge of heated combustion products therethrough. A resilient sealing element 126, for example such as an O-ring provides a seal with the casing, and the resilient seal 126 permits the metal ring seal 124 to rise slightly away from a shoulder 128 when it is in sealing engagement with the piston 97 so that the lip 104 of the other piston presses firmly against the static seal 106. Spring means 130, for example such as a wave spring urges the movable ring seal element 124 down toward the shoulder 128.

In this illustrative example the chamber 93 has a volume of ten cubic inches, the diameter of the piston is 1.75 inches, and the acceleration distance E is ⅜ of an inch. The shuttle 100 attains a velocity in excess of 40 feet per second before releasing the pressurized fluid, and the high-pressure gas is dicharged from this repeater 14 in the order of a few milliseconds after the piston 97 has left the end 119 of the cylinder 95.

The lower end of the cylinder 94 is closed by an end wall 132 which contains the fill passage 90, and the upper end of the chamber 93 is closed by an end wall 134. The various parts of the repeater 14 are secured together by suitable flanges 136 and bolts 138 with O-ring seals 140 included to prevent leakage. A flange 142 on the container 70 is extended and contains an additional row of bolt holes 144 for mounting purposes, if desired.

In order to fire the repeater 14, a control switch 146 is connected in a circuit 148 in series with the solenoid valve 89 and with a source 150 of electrical energy shown as a battery. Manual closure of this switch 146 opens the valve 89 and produces the abrupt discharge of the gases from chamber 93 as discussed above. In the system of FIGURE 3 there are used a pair of such switches connected in circuit with the respective firing valves, as will be understood, and these switches may be actuated simultaneously or in sequence as desired. It will be understood that these switches may be actuated manually or automatically as may be desired.

Figures 6, 7:
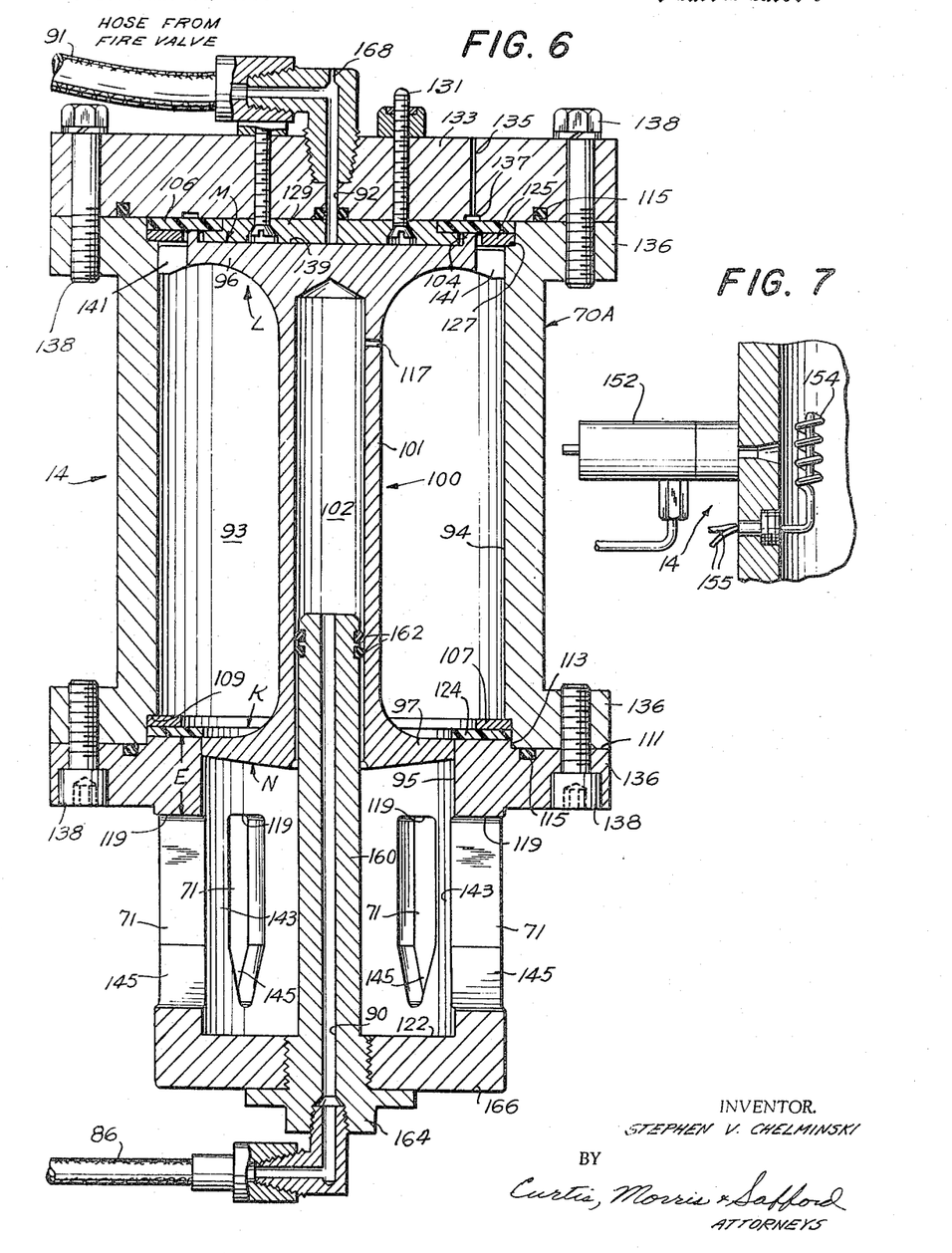
FIGURES 6 and 7 are partial sectional views showing modifications of the repeater of FIGURE 5.

The modified repeater 14 shown partially in FIGURE 7 may be similar to the repeater shown in FIGURES 4 and 5, except that it is adapted for burning fuel therein for raising the pressure of the gases in the chamber 93 prior to making the shot. A fuel injecting device 152 introduces fuel under high pressure into the chamber 102 when this chamber has been filled with compressed air. An electrical heating element 154 is mounted in the chamber 102 for the purpose of igniting the fuel as it is injected into this chamber and is energized by electrical wires 155. In operation the fuel is burned, and then after an interval has passed for allowing the pressurized products of combustion to enter the charge chamber 93, this fueled repeater is shot by opening the valve 89.

The modified repeater shown in FIGURE 6 has many elements performing functions corresponding with those of the repeater 14 shown in FIGURES 4 and 5, and corresponding reference numbers are used for these elements. The container means 70A includes a cylinder 95 which extends toward vent means 71 and another cylinder 94 which is axially aligned with the first cylinder 95. A first piston 97 travels along the cylinder 95 and serves as closing means for blocking the discharge port so as to contain the high-pressure fluid within the charge-containing chamber 93 which is defined by the cylinder 94.

For operating the first piston 97 there is an operating piston 96 which travels along the cylinder 94, and these two pistons are rigidly interconnected to form a shuttle 100 which is constructed so as to be as light as possible while being sufficiently strong to withstand a very great acceleration and subsequently very great deceleration in the axial direction. A hollow piston rod 101 rigidly interconnects these two pistons 96 and 97.

When the shuttle 100 is in its normal position prior to firing, the closing piston 97 is located at the upper end of the cylinder 95 remote from the vent means 71. The rim of the closing piston 97 is in sealing engagement with an annular resilient seal 124 which is clamped in place by a metal clamping retainer ring 107 held by an internal shoulder 109 at the lower end of the cylinder 94. The seal 124 is formed of a very tough, resilient material, for example, tough, solid polyurethane, and it has sufficient ability to be bent and yet to return to its original shape so as to enable it to be slid over the perimeter of the piston 97 when the shuttle 100 and seal 124 are being assembled and sufficient durability to withstand the operating conditions.

The cylinder 95 includes a flange 136 mating with a corresponding flange 136 on the lower end of the cylinder 94. The upper end of the cylinder 95 projects somewhat above the top surface 111 of the flange 136 so as to form a lip 113 engaging with the lower end of the upper cylinder below the internal shoulder 109 for precisely aligning the two cylinders. The flange surface 111 has an annular groove containing an O-ring 115 abutting against the other flange for preventing leakage of high pressure fluid from the chamber 93.

In preparation for firing, gas under pressure, for example 2,000 p.s.i. is fed in through the hose 86 and up through a fill passage 90 into the hollow piston rod 101 and is introduced through an opening 117 into the chamber 93 within the cylinder 94. The pressure of the gas upon the upper surface K of the closing piston 97 is tending to drive this piston down along the cylinder 95.

In order to hold this piston in place, the other piston 96 has a surface L exposed to the pressure fluid in the container and of larger effective area than area K and facing in the opposite direction from area K. This operating piston has an annular lip sealing element 104 engaging up against a second annular tough resilient seal 106. This seal 106 may be formed of the same material as the seal 124. A clamping retainer ring 125 is held against the outer edge of the seal 106 by an internal shoulder 127 at the upper end of the cylinder 94. The inner edge of the seal 106 is held by a retained disc stop 129 having a rabbeted edge overlapping the seal 106. A plurality of bolts 131 secure the disc 129 against the cylinder head wall 133.

When the repeater 14 is fired, the pressure within the chamber 93 drops very abruptly. Consequently, it is desirable to prevent the accumulation of any high pressure fluid behind the seal 106, because any such pocket of gas would tend to blow the seal 106 away from the end wall 133 upon firing. Accordingly, a small diameter bleed hole 135 passes through the end wall 133 and communicates with a bleed channel 137 behind the seal 106. The outer diameter of the piston lip element 104 is greater than the diameter of the piston 97. The upper surface M of the operating piston 96 engages against the retainer stop disc 129 as the lip 104 begins to press into the resilient seal 106. This stop 129 prevents the large thrust of the piston from embedding the lip element 104 deeply into the seal 106.

The shuttle 100 is in effect in unstable equilibrium, being temporarily held in place by the differential in areas, but as soon as the pressure nears equalization on opposite surfaces of the operating piston 96, then the shuttle is released and accelerates violently.

In order to fire the repeater 14, communication is provided between the high pressure fluid and the upper surface M of the operating piston 96 so as to tend to equalize the pressures against opposite sides L and M of this operating piston. The fire valve 89 (FIGURE 4) is opened and a passage is thus completed from the fill port 90 through the lines 86, 85 and 91 to the firing port 92. There is a small chamber 139 surrounding the firing port 92 adjacent to the surface M of the piston 96, and the high pressure fluid enters through the port 92 into this chamber 139 thus tending to equalize the pressure against opposite piston surfaces M and L. The high pressure fluid pressing against the surface K of piston 97 soon overbalances the holding force of the piston 96 so that the piston 97 begins to accelerate rapidly down the cylinder 95. Thus, the sealing lip 104 is moved away from the seal 106.

Immediately, the fluid in the chamber 93 is free to rush up through a plurality of by-pass openings 141 in the scalloped periphery of this piston 96 so as to equalize completely the pressure against opposite sides M and L of this piston. The lands between the by-pass openings 141 serve as guide means travelling along the cylinder surface 94. It will be understood that the perimeter of the piston 96 may be circular and these by-pass openings may then be provided by lands extending along the cylinder wall with grooves between such lands.

For imparting a slight rotation to the pistons 96 and 97 the by-pass openings 141 are skewed and as the gas rushes through these openings it provides a torque reaction. Thus, advantageously the pistons 96 and 97 are turned in position between each firing stroke so as to avoid continued wear of the lands always along the same axially extending lines on the cylinder surface 94.

The two pistons 96 and 97 accelerate downwardly with very great acceleration along the acceleration distance E, but the high pressure gas is prevented from escaping through the vent means 71 until after the rim of the piston 97 has passed below the upper end 119 of the vent means 71. The vent means 71 comprise a plurality of openings to the exterior of the housing means 70A and communicating with the lower end of the cylinder 95, and the longitudinally extending areas 143 between each of the vent openings serve as guide surfaces for guiding the piston 97.

As the piston 97 travels along the acceleration distance E, it accelerates extremely rapidly to a high velocity so that it passes the end 119 of the cylinder 95 extremely fast so that the vents become fully open in a minute fraction of a second. To explain this advantageous high rate of speed of opening, the following discussion is believed to be helpful.

In this illustrative example the chamber 93 has a volume of one hundred thirty five cubic inches and is charged with compressed air to a pressure of 2,000 p.s.i. The diameter of the closing piston 97 is 3.1 inches, and the acceleration distance E is one inch. The shuttle accelerates to a velocity in excess of 40 feet per second before the piston 97 begins to open the discharge openings 96. Thus, the compressed air is all released within a few milliseconds after the piston passes the end 119 of the cylinder 95. The high pressure gas is thus released with effectively an extremely abrupt discharge which approaches explosive abruptness.

In order to decelerate the shuttle 100 quickly but smoothly near the end of the stroke, the housing means 70A includes a stop surface 122 which is in opposed relationship to the surface N of the piston 97. As this piston 97 nears the end of its stroke the liquid between the approaching surfaces N and 122 is accelerated generally radially outwardly, providing a retarding force reaction against the surface N. Moreover, the converging lower ends 145 of the vents 71 cooperate with the rim of the piston 97 to form throttling means, i.e., flow control means, progressively restricting the egress of the water so as to control the deceleration rate until the piston is brought to rest adjacent to the surface 122. It will be understood that various configurations of vents 71 may be used in the repeaters shown in FIGURES 4, 5, 6 and 7 to provide different effective rates of discharge of the gas therefrom and to provide different rates of piston deceleration, as may be desired.

After discharge of the repeater, the shuttle 100 is returned to its initial position by the pressure fluid entering through the fill port 90 and into a return chamber 102 within the hollow piston rod 101. The fill port 90 extends up through a pedestal 160 including suitable sealing means 162 such as piston rings, O-rings, and the like fitting into grooves near the upper end of the pedestal 162. This pedestal 160 includes a base 164 which is rigidly mounted in the lower end 166 of the housing 70A.

A bleed hole 168 communicating with the firing port 92 prevents any accidental rise in pressure in the firing chamber 139 adjacent to the piston surface M and thus avoids any possibility for accidental self-firing of the repeater in the event it remains charged for a long time period. Any minute amount of high pressure fluid leaking past the sealing means 104, 106 over a long period of time is prevented from accumulating in the firing chamber 139.

As shown in FIGURE 7, the repeater 14 of FIGURE 6 may include a fuel injecting device 152 and a fuel-igniting element 154 for introducing fuel under high pressure into the chamber 93 when this chamber is filled with compressed air and for burning this fuel so as to provide a marked increase in pressure therein prior to the firing of the repeater by opening the valve 89.

It is to be understood that the repeaters provide an abrupt release of the high pressure gas into the tank 12. Thus, advantageously the powerful impulse 25 is intense and is propagated through the water 20 at a velocity which is so fast that it approaches the natural vibrational frequency of earth materials and hence this powerful seismic impulse is coupled efficiently into the earth. Moreover, the diaphragm 16 covers a large area of the ground, preferably in excess of six square feet so as to provide large-area coupling into the earth.

The various acoustical repeaters 14 as shown herein are illustrative of gas-releasing devices for abruptly releasing pressurized gas which may be used in the seismic exploration methods and systems embodying the present invention, but it will be understood that other types of devices for abruptly releasing pressurized gas into the water 20 may be used, for example such as those devices shown in my copending application Ser. No. 322,677 filed on Nov. 12, 1963, entitled "Powerful Sound Impulse Generation Methods and Apparatus." The reader's attention is invited to said copending application for further examples of these devices and various control systems which may be used for operating them.

It will be understood that the rigid tank 12 and the water 20 cooperate to provide a highly effective coupling of the intense pressure impulse through the diaphragm 16 into the earth 18. The abrupt release of gas into the water 20 produces an intense pressure impulse. The rigid tank 12 prevents the water from being blown horizontally away from the gas-releasing device 14 and the reaction of the large mass of water above the device 14 aids in directing the intense pressure impulse down into the earth so as to provide an efficient transfer of energy into the earth to produce the desired tremors therein. It is possible to use other liquids rather than water, if they have a suitably high specific density so as to provide the desired coupling of energy into the earth, for example such liquids as hydraulic fluid, lubricating oil, fuel oil, and the like; however, in most cases water is used because it is suitably dense, relatively non-compressible and safe to handle as well as being less expensive.

From the foregoing it will be understood that the seismic exploration methods and systems described herein as illustrative embodiments of the present invention are well suited to provide the advantages set forth, and since many possible embodiments can be made of the various features of this invention and as the methods and apparatus described herein may be varied in various parts, all without departing from the scope of the invention, it is to be understood that all matter hereinbefore set forth or shown in the accompanying drawings is to be interpreted as illustrative and not in a limiting sense and that in certain instances some of the features of the invention may be used without a corresponding use of other features or may be modified into equivalent elements, all without departing from the scope of the invention as defined by the following claims.

What is claimed is:

1. A seismic impulse source for use in exploration of the conditions and characteristics of geologic formations beneath an unsubmerged land surface comprising a tank for holding liquid adapted to be placed on the ground, means for supplying liquid to the tank and for removing liquid from the tank for conveniently transporting the source, means providing pressurized gas, a repeater gas releasing device supplied with pressurized gas and having piston means repeatedly confining the gas under high pressure and repeatedly abruptly releasing the pressurized gas therefrom, means for mounting said device within said tank below the level of the liquid therein for releasing the pressurized gas ino the tank beneath the level of the liquid in the tank for providing intense acoustical impulses when the pressurized gas is abruptly released from said device into the liquid, said mounting means allowing said repeater device to move to absorb the recoil from said abrupt release, means for transmitting the abrupt impulses from the liquid in the tank into the ground, and vent means from the tank for venting the gas from the tank.

2. A seismic impulse source transmitting intense vibrational impulses into the earth for seismic exploration of geologic formations comprising a cylindrical tank for holding liquid adapted to be placed on unsubmerged ground with the axis of the tank extending upwardly, a repeater gas releasing device containing gas under high pressure and abruptly releasing the pressurized gas therefrom, means for mounting said device within said tank in position to be within the liquid therein for releasing the pressurized gas into the tank at a level beneath the majority of the liquid in the tank for providing intense acoustical impulses when the pressurized gas is abruptly released from said device into the liquid, means for transmitting the abrupt impulses from the liquid in the tank into the ground, vent means from the tank for venting the gas from the tank, and baffle means retaining the liquid for preventing the liquid from being blasted out of said vent means and permitting the retained liquid to drain back down to its normal initial position.

3. A seismic impulse source for use on land in surveying underground conditions comprising a tank having rigid side walls, displaceable means forming an end portion of the tank adapted to be placed in contact with the ground for holding liquid in the tank above said displaceable means and for transmitting repeated impulses from the liquid into the ground, and means for repeatedly containing gas under high pressure and repeatedly abruptly releasing the pressurized gas into the liquid for transmitting a sequence of repeated abrupt impulses down through the liquid and through said displaceable means into the ground.

4. An impulse source for making seismic surveys of geologic formations comprising a tank having a flexible diaphragm defining a portion of the tank adapted to be placed against the earth and wall means for supporting water adjacent to said diaphragm, repeater means for abruptly releasing pressurized gas into the water for propagating a powerful sound impulse through the water and through said diaphragm into the earth, and said wall means including a thrust area exposed to the pressure of the water adjacent to said diaphragm for thrusting the tank firmly against the earth as said powerful sound impulse is being propagated into the earth.

5. A mobile impulse source for making seismic surveys on land of earth formations comprising a tank having a flexible diaphragm area arranged to be placed against the earth with water in the tank against said diaphragm area, repeater means mounted within said tank in position to be within the water therein, a source of compressed air under high pressure connected to said repeater means for supplying pressurized air thereto, said repeater means having piston means repeatedly containing the pressurized air and repeatedly abruptly releasing the pressurized air into the water in the tank for propagating powerful sound impulses through the water and through said diaphragm area into the earth, a vent means for venting the air from the tank, baffle means retaining the water in the tank for preventing the water from being blasted out of said vent means and allowing the water to return down to its normal initial position, a vehicle for carrying said tank, mounting means for movably mounting the tank on said vehicle, and mechanism for moving the tank on the vehicle to hold said diaphragm area against the earth.

6. A mobile impulse source for making seismic surveys on land of earth formations comprising a tank having a flexible end portion, a vehicle for carrying said tank, mounting means for movably mounting the tank on said vehicle, force mechanism for pressing the tank downwardly firmly against the surface of the earth with the flexible end portion of the tank firmly against the earth, means for putting liquid in the tank against said flexible end portion, and repeater means located in the liquid in said tank abruptly releasing pressurized gas into the liquid in the tank for propagating a powerful sound impulse through the liquid and through said flexible end portion into the earth.

7. A sound source for introducing seismic impulses into the earth for making geologic surveys comprising a cylindrical tank having a movable end portion adapted to be placed in contact with the earth with liquid against said movable end portion, repeater means in the tank for abruptly releasing pressurized gas into the liquid in the tank near the axis of the tank for transmitting a powerful sound impulse through the liquid and through said movable end portion into the earth, and a rigid annular thrust surface surrounding said movable end portion and connected to the tank and exposed to the liquid in the tank for utilizing a portion of said sound impulse to thrust the tank firmly against the earth as said sound impulse is transmitted into the earth.

8. A seismic impulse source for use in surveying underground conditions comprising a tank having rigid side walls, displaceable means forming an end portion of the tank adapted to be placed in content with the ground for holding liquid in the tank against said displaceable means and for transmitting impulses from the liquid into the ground, repeater means having piston means repeatedly confining highly pressurized gas and repeatedly abruptly releasing the pressurized gas into the liquid for transmitting a sequence of abrupt impulses down through the liquid and through said displaceable means into the ground, and a movable mounting for mounting said repeater means in said tank for allowing said repeater means to move to absorb the recoil of the abrupt release of pressurized gas.

9. A sound source for introducing seismic impulses into the earth for making geologic surveys comprising a cylindrical tank having a movable end portion adapted to be placed in contact with the earth with liquid against said movable end portion, repeater means in the tank for abruptly releasing pressurized gas into the liquid in the tank near the axis of the tank for transmitting a powerful sound impulse through the liquid and through said movable end portion into the earth, and a rigid truncated conical thrust surface surrounding said movable end portion and sloping inwardly and downwardly toward said movable end portion and connected to the tank for utilizing a portion of said sound impulse to thrust the tank firmly against the earth as said sound impulse is transmitted into the earth.

10. A mobile seismic impulse source for use in surveying underground conditions comprising a tank having a slack, limp, flexible diaphragm forming an end portion of the tank adapted to be placed in contact with the ground and rigid wall means connected to said diaphragm for holding liquid in the tank above said diaphragm, said diaphragm being adapted for transmitting impulses from the liquid through said diaphragm into the ground, means confining gas under high pressure within the liquid in said tank and abruptly releasing the pressurized gas into the liquid for transmitting an abrupt impulse down through the liquid and through said diaphragm into the ground, a vehicle for transporting said tank, and double-acting mechanism for lifting said tank away from the ground and for urging said tank down with said diaphragm pressed firmly against the ground.

11. An exploration system for making a seismic survey of earth formations comprising a plurality of tanks containing liquid each having a displaceable portion in contact with the earth, a plurality of repeater means, each of said repeater means being positioned in a respective tank in position to be in the liquid therein, each of said repeater means having fast travelling piston means repeatedly containing highly pressurized gas in the repeater means and repeatedly abruptly releasing the pressurized gas into the liquid in each tank for transmitting seismic impulses through said displaceable portions of the respective tanks into the earth, a plurality of electrically actuated valves, each of said valves controlling the respective piston means for abruptly releasing the pressurized gas, a plurality of geophones arranged at spaced intervals in vibration receiving relationship with the earth, recording means connected to said geophones for recording the vibrations travelling through the earth from said impulses, and electrical control means connected to said valves for abruptly releasing the pressurized gas from said repeater means into the liquid in the respective tanks at timed intervals.

12. A method for seismic exploration of geologic formations located beneath the surface of the land comprising the steps of confining a plurality of volumes of non-compressible liquid of high specific density in a plurality of containers above the land surface, placing the bottoms of said volumes of water in compressional impulse transmitting relationship with the land surface at a plurality of locations, confining gas under high pressure, abruptly releasing the high pressure gas into each of said volumes of liquid for transmitting an intense compressional impulse from the liquid down into the ground at the respective locations, sensing the resulting earth tremors received in the ground at a plurality of respective points spaced from said locations, retaining said volumes of liquid in the respective containers, repeating the confining of gas under high pressure, repeating the abrupt release of said high pressure gas into each of said volumes of liquid for repeating the transmission of an intense compressional impulse from the liquid down into the ground at said respective locations, repeating the sensing of the resulting earth tremors received at said plurality of respective points, and correlating the resulting information from the sequence of earth tremors provided by the repeated steps, by virtue of all of which improved information is obtained about the conditions and characteristics of the geologic formations in the region being surveyed.

13. A seismic survey vehicle for use on land for exploration of geologic formations located beneath the land surface comprising a chassis, a tank mounted on the chassis and having a strong, flexible area of resilient material engaging the land surface; means for supplying liquid into the tank; a connection for feeding compressed air under high pressure into the tank; a repeater device mounted within the tank surrounded by the liquid, said repeater device being connected to said compressed air connection; and said repeater device having piston means repeatedly confining the compressed air under high pressure within said device within the liquid, said piston means being fast travelling and repeatedly abruptly releasing the compressed air into the liquid by virtue of which a sequence of repeated intense seismic impulses are transmitted down into the formations beneath said vehicle.

References Cited by the Examiner

UNITED STATES PATENTS

| | | | |
|---|---|---|---|
| 2,167,536 | 7/1939 | Suits | 340—12 |
| 2,387,770 | 10/1945 | Rogers et al. | 181—.5 |
| 2,558,924 | 7/1951 | Blake | 181—.5 |
| 2,561,309 | 7/1951 | Gaby | 181—.5 |
| 2,772,746 | 12/1956 | Merten | 181—.5 |
| 2,849,076 | 8/1958 | Kaufman | 181—.5 |
| 2,994,397 | 8/1961 | Huckabay | 181—.5 |
| 3,077,944 | 2/1963 | Padberg | 181—.5 |
| 3,209,322 | 9/1965 | Doty | 181—.5 |
| 3,249,177 | 5/1966 | Chelminski | 181—.5 |

BENJAMIN A. BORCHELT, *Primary Examiner.*

G. H. GLANZMAN, *Assistant Examiner.*